Figure 1:
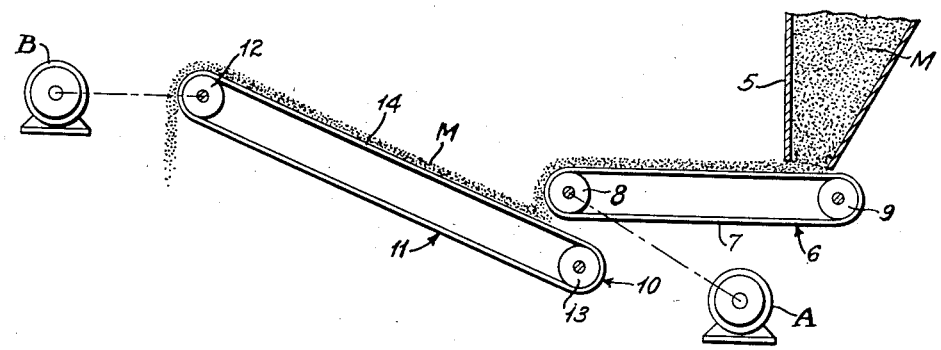

Sept. 18, 1956

W. J. HEACOCK 2,763,399

FEEDER MECHANISM

Filed March 2, 1955

3 Sheets-Sheet 1

Sept. 18, 1956 W. J. HEACOCK 2,763,399
FEEDER MECHANISM
Filed March 2, 1955 3 Sheets-Sheet 3

UNITED STATES PATENT OFFICE 2,763,399
Patented Sept. 18, 1956

2,763,399

FEEDER MECHANISM

Ward J. Heacock, Chicago, Ill., assignor to Link-Belt Company, a corporation of Illinois Application March 2, 1955, Serial No. 491,722

12 Claims. (Cl. 222—55)

This invention relates to new and useful improvements in a feeder mechanism for delivering flowable solids at a constant rate to a point of discharge.

There is in modern industrial plants a widespread use of various types of mechanisms for feeding flowable solids from sources of supply, such as storage bins and the like, to points of discharge. In many of such installations, it is essential that the weight of the flowable solids delivered during a unit of time be maintained at a constant, preselected value. In other words, the weight rate of delivery of the feeder mechanism must remain constant. When the circumstances under which a particular installation is to be made indicate that the desired feeding operation can best be carried out by means of some form of belt conveyor, and a constant weight rate of delivery of the handled solids is required, many difficulties have been encountered in the past in designing mechanism that will effect the desired delivery rate.

For example, it is the usual practice to attempt to obtain the desired delivery rate by supporting a portion of the active run of the conveyor belt on a scale mechanism which detects variations in the weight of the material moving directly over the scale mechanism and by adjusting the belt speed to compensate for each variation. Since the operation of the entire belt conveyor is controlled in accordance with the weight of only the portion of the conveyed material that is located on the scale supported portion of the belt, a time lag will occur between the detection of a weight variation and the compensating correction of the belt speed. Also, a lack of uniformity in the distribution of the material on the belt will cause the delivery rate of the feeder mechanism to be somewhat erratic.

It is the primary object of this invention to provide a feeder mechanism which will constantly maintain the desired weight rate of delivery of the material regardless of the variations that may occur in the total weight of the material received by the feeder mechanism during successive increments of time.

A further important object of the invention is to provide a belt conveyor type of feeder mechanism which is adjustable for a weight rate of delivery of a preselected value and which is accurately and constantly maintained at such value by the immediate compensation for any variations that may occur therein.

Still another object of the invention is to provide a feeder mechanism of the above mentioned type which will maintain a constant, preselected delivery rate by compensating for deviations that may occur in the total weight of the flowable material that is being handled by one unitary part of the mechanism.

Another object of the invention is to provide a feeder mechanism including two conveyor units connected in series and in which the rate of feed of the material from the first unit to the second unit is varied in accordance with the speed of operation of the second unit, and the speed of operation of the second unit is varied in accordance with the total weight of the material being transported by such second unit.

Other objects and advantages of the invention will be apparent during the course of the following description.

Figure 2:
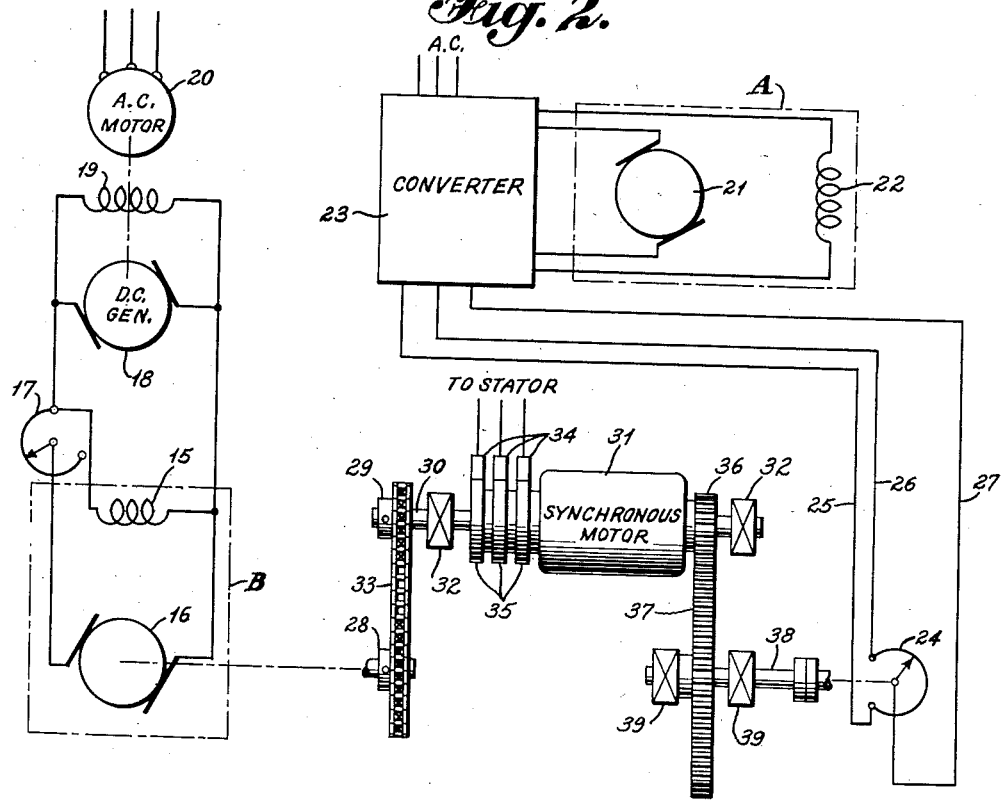
Figure 3:
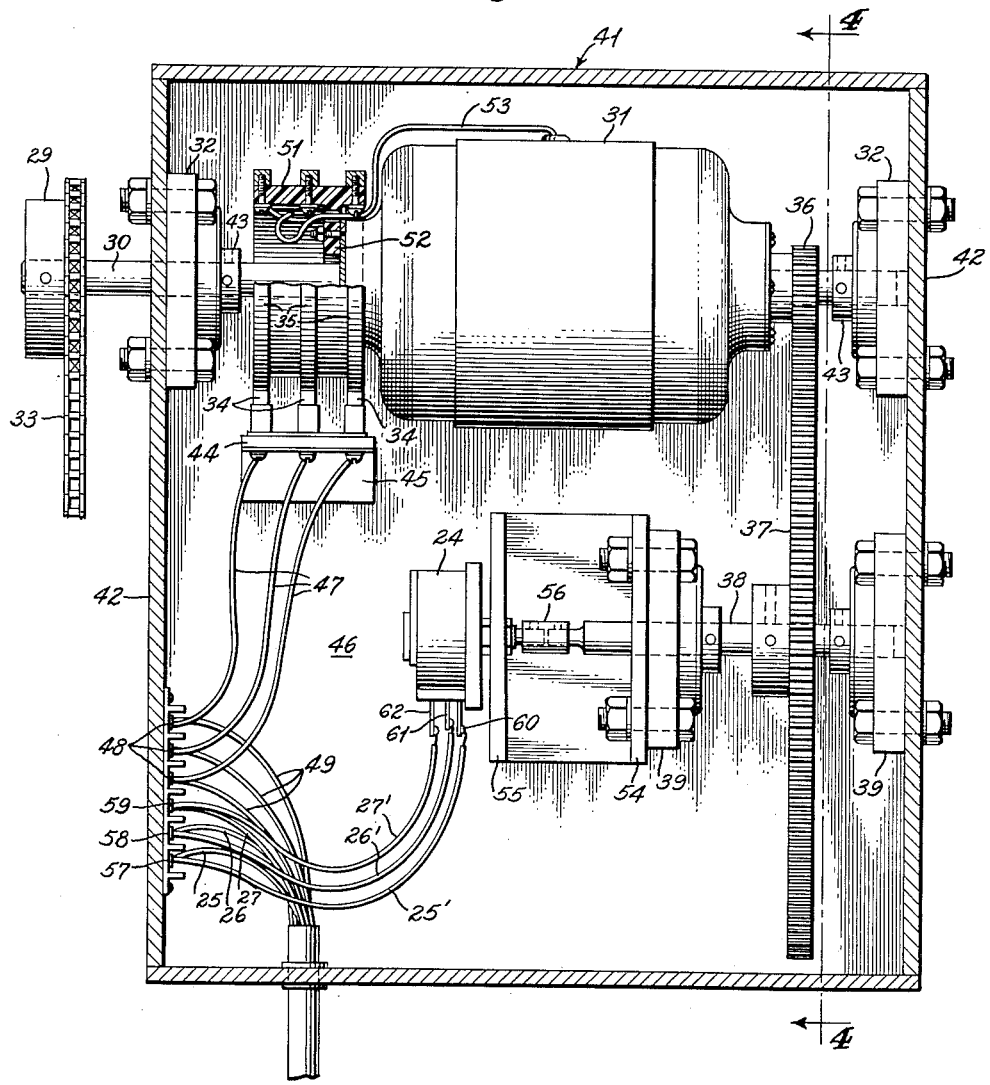
Figure 4:
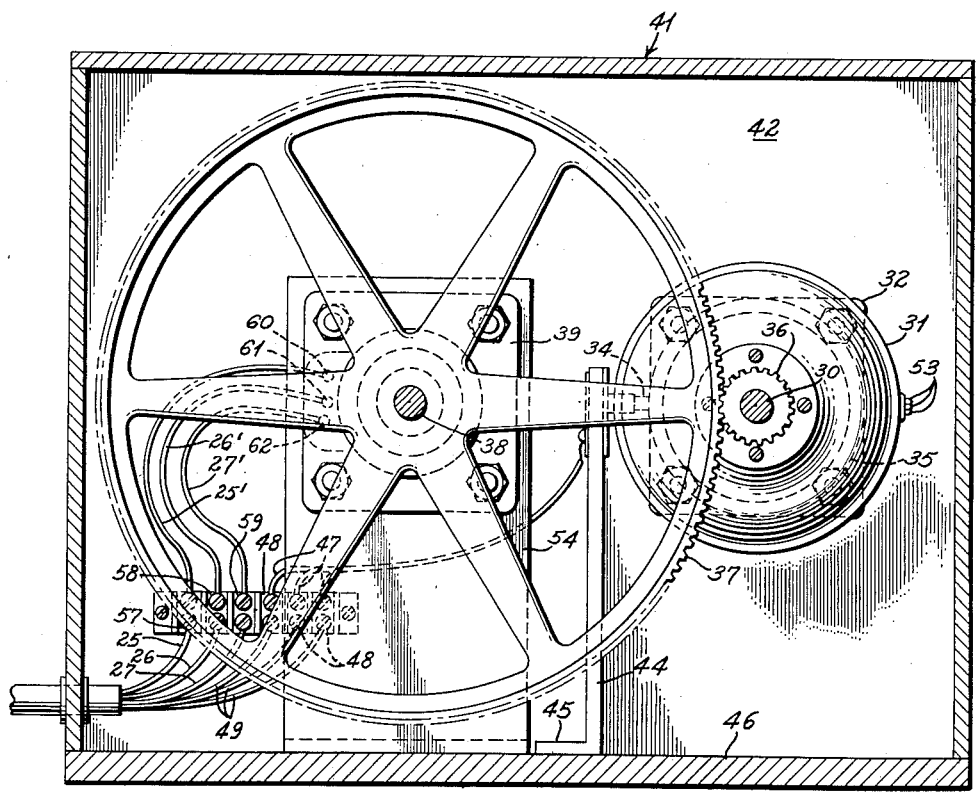

In the accompanying drawings forming a part of this specification and in which like reference characters are employed to designate like parts throughout the same, Figure 1 is a schematic view of the serially arranged conveyor units that form a part of the mechanism embodying the invention, Figure 2 is a diagrammatic view of the electrical controls and motors employed for operating the conveyor units illustrated in Fig. 1, Figure 3 is a horizontal, sectional view of the control equipment illustrated diagrammatically in Fig. 2, and Figure 4 is a vertical sectional view taken on line 4—4 of Fig. 3.

In the drawings, wherein for the purpose of illustration is shown the preferred embodiment of the invention, and first particularly referring to Fig. 1, there is shown a supply hopper 5 containing material M. Positioned beneath the discharge opening at the bottom of the hopper 5 for receiving material M therefrom is a belt conveyor 6. This conveyor 6 comprises an endless belt 7 trained over a head pulley 8 and a tail pulley 9. The belt 7 may be supported between the head and tail pulleys 8 and 9, respectively, in any conventional manner. Drivingly connected to the head pulley 8 is a motor A for imparting the desired movement to the belt 7.

The conveyor 6 delivers the material M from the hopper 5 to a second belt conveyor 10 comprising an endless belt 11 which is trained around a head pulley 12 and a tail pulley 13 that are so positioned as to cause the active or load carrying run 14 to move through a straight upwardly inclined path. This active run 14 may be supported between the head pulley 12 and tail pulley 13 in any conventional manner. A motor B is drivingly connected to the head pulley 12 to impart the desired movement to the belt 11.

Referring now to Fig. 2, for a detail description of the motors A and B, the motor B is diagrammatically illustrated as being of a direct current, shunt-wound type having its field windings 15 connected in parallel relationship with the armature 16 and having a rheostat 17 connected to provide a variable resistance in the armature circuit. The motor B is further illustrated as being supplied with electrical energy from a direct current generator having an armature 18 and a field 19 and driven by an alternating current motor 20 which is supplied with electrical energy from a conventional alternating current source. It will be readily apparent, however, that the motor 20 and the direct current generator may be dispensed with in those installations where a direct current supply source is available.

The direct current shunt-wound motor B will inherently operate at a speed which is variable in an inverse relationship with the torque delivered by the motor. The relationship between the speed and the delivered torque of the motor B, however, may be varied by adjustment of the rheostat 17 to change the resistance in the circuit through the armature 16 of the motor. In other words, the rheostat 17 may be adjusted to provide operation of the motor B at a given speed for different values of delivered torque. These operating characteristics of the motor B may be duplicated by a wound rotor type alternating current motor if proper provision is made for maintaining a constant voltage at the supply source and by series or compound wound direct current motors. Applicant, therefore, does not wish to be limited to the specific type of motor illustrated in Fig. 2 as an example of one which will provide the desired operating characteristics outlined above.

The motor A for the conveyor 6 is also illustrated in Fig. 2 as being a shunt-wound direct current motor having an armature 21 and a field 22 arranged in parallel relationship. The motor A receives its supply of direct current from an electronic converter 23 of any conventional type which will function to convert the electrical energy from the alternating current supply source to direct current. As was mentioned in connection with motor B above, the motor A might also be connected to a direct current supply source if such a source is available at the point of installation. The speed of operation of the motor A under a fixed load is adjustable by means of the potentiometer 24 which is connected by wires 25, 26 and 27 to the converter 23 and provides a variable resistance in the circuit of the field 22 of the motor A. The essential operating characteristic of the motor A is that its speed be adjustable while the motor is delivering a fixed torque. This type of speed adjustment might also be provided by other types of direct current motors or by alternating current motors employing a brush-shifting mechanism in lieu of the converter 23 and potentiometer 24.

Drivingly connected to the motor B for rotation thereby is a drive sprocket 28 which is arranged in alignment with a driven sprocket 29 rigidly mounted on the shaft 30 of a synchronous motor 31. The shaft 30 is supported for rotary movement by bearings 32 and the sprockets 28 and 29 are connected by a drive chain 33 so that the rotor of the synchronous motor 31 will be driven at a speed which is directly proportional to the speed of the motor B. The stator of the synchronous motor 31 is rotatably supported on the shaft 30 and receives its supply of alternating current through brushes 34 and rings 35, the latter being carried by the stator. A pinion 36 is mounted on the stator of the motor 31 for movement therewith and in meshing engagement with a gear 37 carried by a shaft 38. The shaft 38 is supported for rotation by bearings 39 and is connected to the movable arm of the potentiometer 24 so that rotation of the shaft will effect movement of the arm.

Referring now to Figs. 3 and 4 for a detail description of the structure and arrangement of the control elements diagrammatically illustrated in Fig. 2, it will be noted that the synchronous motor 31 is supported in a housing 41 by the bearings 32 that are mounted on the opposite end walls 42, with one end portion of the shaft 30 projecting through an opening in the associated end wall for receiving the driven sprocket 29. Thrust collars 43 are mounted on the shaft inwardly of and adjacent the bearings 32 to prevent longitudinal movement of the shaft 30. A mounting bracket 44 having a flanged base 45 is mounted on the bottom wall 46 of the housing 41 for receiving the brushes 34 which are connected by wires 47 to separate terminals 48 on one of the end walls 42. Lead-in wires 49 in turn connect the terminals 48 to the source of alternating current.

The pinion 36 is mounted on the end of the stator of the synchronous motor 31 opposite the rings 35 and in alignment with the meshing gear 37. The shaft 38 upon which the gear 37 is fixed has one of its supporting bearings 39 mounted on the adjacent end wall 42 of the housing 41 and the other bearing 39 is supported by a bracket arm 54 which projects upwardly from the bottom wall 46 of the housing. One end of the shaft 38 extends through an opening in the bracket arm 54 in axial alignment with the potentiometer 24 which is mounted on a spaced bracket arm 55. The end of the shaft 38 and the rotary arm of the potentiometer 24 are connected by a sleeve type coupling 56.

Wires 25, 26 and 27 are connected to the potentiometer 24 through terminals 57, 58 and 59, respectively, and wires 25', 26' and 27' which lead from the terminals 57, 58 and 59 to the leads 60, 61 and 62, respectively, of the potentiometer 24.

Referring once again to Figs. 1 and 2 for a detail description of the manner in which the invention operates to maintain a constant weight rate of delivery for the material M at the upper or discharge end of the active run 14 of the belt 11, it will be recalled that the motor B is of a type operating at a speed which is variable in inverse relationship to that of the torque delivered by the motor B. Since the torque delivered by the motor B is directly related to the weight of the material M on the belt 11, it may be further stated that the speed of operation of the motor B is inversely related to the weight of the material on the belt. The belt 11 is inclined at a maximum practical angle so that variations in the weight of the material M on the belt will have a maximum gravitational effect on the loading of the belt. In other words, the inclined arrangement of the belt 11 will cause variations in the weight of the material M on the belt to effect greater variations in the torque required from the motor B than would result if the belt were arranged for movement along a horizontal path. The belt is supported for movement of its active run 14 through a straight path so that variations in the weight of the material M on the belt will have the same effect on the delivered torque of the motor B at all points along the active run.

It has been previously stated that the sprocket 28 will drive the sprocket 29 through the drive chain 33 to rotate the shaft 30 and the rotor of the synchronous motor 31 at a speed that is directly proportional to the speed of operation of the motor B. Further, at one particular speed of the motor B, the rotor of the motor 31 will be rotated at the synchronous speed of the synchronous motor. Since the speed of the motor B is inversely proportional to the weight of the material M on the belt 11, it will be readily apparent that the motor B will actuate the rotor of the motor 31 at the synchronous speed of the motor only when a given weight of material M is present on the belt 11. Of course, the rheostat 17 may be adjusted to vary the relationship between the speed of the motor B and the weight of the material M on the belt 11 so that the setting of the rheostat may be selected to provide the desired weight of material on the belt while maintaining the speed of operation of the motor B at a value at which the rotor of the synchronous motor 31 will be rotated at synchronous speed.

So long as the rotor of the motor 31 is actuated at the synchronous speed of this motor, the relative rotation between the rotor and the stator of the motor 31 will be at the latter's synchronous speed and there will be no movement of the stator. If, however, a slight variation in the weight of the material M on the belt 11 causes the motor B to rotate the rotor at any speed above or below the synchronous speed of the motor 31, a torque will be applied to the stator of the motor 31 to cause it to rotate in a direction to return the relative speed of the rotor with respect to the stator to the synchronous speed of the motor. In other words, if the rotor is actuated at a speed below the synchronous speed of the motor 31 the stator will rotate in a direction opposite that of the rotor, and if the rotor is actuated at a speed above the synchronous speed of the motor the stator will rotate in the same direction as the rotor. Any rotation of the stator of the motor 31, however, will cause the pinion 36 to drive the gear 37 and rotate the shaft 38 to vary the setting of the potentiometer 24. Such a variation in the setting of the potentiometer 24 will effect a change in the speed of operation of the motor A to increase the rate of delivery of material onto the lower end portion of the active run 14 of the belt 11 when the rotor is rotated at a speed above the synchronous speed of the motor 31 and to decrease the rate of delivery of material onto the active run 14 when the speed of rotation of the rotor is below the synchronous speed of the motor 31. The increase or decrease in the rate of delivery of the material M onto the belt 11 by the belt 7 will immediately increase or decrease the weight of the material M on the belt 11 to cause the speed of the motor B to return to a value at which the rotor is rotated at the synchronous speed of the motor 31.

In other words, the weight of the material M on the belt 11 and the speed of operation of the motor B for driving the belt are maintained at constant values by adjusting the delivery rate of the material at the discharge end of the belt 7. It will be noted that increases or decreases in the rate of delivery of material M onto the belt 11 will follow substantially instantaneously after the slightest variation in the speed of operation of the motor B so that there will be no lag between the variation in weight of the material on the belt 11 and the change in the rate of delivery of material onto the belt by means of which the variation is corrected. Further, since there is no time lag between the variation and the correction of the variation, there will be no hunting inherent in the control. Also, the delivery rate of material from the discharge end of the active run 14 of the belt 11 may be quickly and easily varied by adjustment of the rheostat 17 and will be thereafter maintained at the newly selected value.

It is to be understood that the form of this invention herewith shown and described is to be taken as the preferred example of the same, and that various changes in the shape, size, and arrangement of parts may be resorted to without departing from the spirit of the invention or the scope of the subjoined claims.

Having thus described the invention, I claim:

1. A feeder mechanism, comprising transfer means for receiving material from a source of supply at a varying rate, a conveyor for receiving material from said transfer means and delivering the material through a fixed, upwardly inclined path to a point of discharge at a preselected constant weight rate of delivery, a prime mover responsive to vairations in the load driven thereby for operating said conveyor at a speed automatically varying in inverse relationship with the total weight of the material being transported by the conveyor, and means for adjusting the speed of said transfer means in response to variations in the speed of said prime mover from a preselected value to regulate the rate of transfer of material to said conveyor by said transfer means and to thereby maintain the total weight of the material being transported by said conveyor at a substantially constant value at which the prime mover will operate at its preselected speed.

2. A feeder mechanism, comprising transfer means for receiving material from a source of supply at a varying rate, a conveyor for receiving material from said transfer means and delivering the material through a fixed, upwardly inclined path to a point of discharge at a preselected constant weight rate of delivery, first and second prime movers for driving said transfer means and said conveyor, respectively, the speed of operation of the second prime mover automatically varying in inverse relationship with variations in the total weight of the material being transported by said conveyor, means for controlling the speed of operation of the first prime mover, and means for operating said control means to adjust the speed of operation of the first prime mover in response to variations in the speed of the second prime mover from a preselected value, the adjustments of the speed of said first prime mover regulating the rate of transfer of material to said conveyor by said transfer means to cause the total weight of the material being transported by said conveyor to be maintained at a substantially constant value at which the second prime mover will operate at its preselected speed.

3. A feeder mechanism, comprising transfer means for receiving material from a source of supply at a varying rate, a conveyor for receiving material from said transfer means and delivering the material through a fixed, upwardly inclined path to a point of discharge at a preselected constant weight rate of delivery, first and second prime movers for driving said transfer means and said conveyor, respectively, the speed of operation of the second prime mover automatically varying in inverse relationship with variations in the total weight of the material being tansported by said conveyor, means for varying the relationship between the speed of said second prime mover and the total weight of the material being transported by said conveyor, and means for adjusting the speed of operation of said first prime mover in response to variations in the speed of operation of said second prime mover from a preselected value to maintain the total weight of the material being transported by said conveyor at a substantially constant value at which the second prime mover will operate at its preselected speed.

4. A feeder mechanism, comprising transfer means for receiving material from a source of supply at a varying rate, a belt conveyor for receiving material from said transfer means and transporting the material through a fixed, upwardly inclined straight path to a point of discharge at a preselected constant weight rate of delivery, first and second prime movers for driving said transfer means and said conveyor, respectively, the speed of operation of the second prime mover automatically varying in inverse relationship with variations in the total weight of the material being transported by said conveyor, means for controlling the speed of operation of the first prime mover, and means for operating said control means to adjust the speed of operation of the first prime mover in response to variations in the speed of the second prime mover from a preselected value, the adjustments of the speed of said first prime mover causing the total weight of the material being transported by said conveyor to be maintained at a substantially constant value at which the second prime mover will operate at its preselected speed.

5. A feeder mechanism, comprising a first conveyor unit receiving the material to be fed from a source of supply at a varying rate, a second conveyor unit receiving the material from the first conveyor unit for delivery through a fixed, upwardly inclined path to a point of discharge at a preselected constant rate, first and second prime movers for driving the first and second conveyor units, respectively, the speed of operation of the second prime mover automatically varying in inverse relationship with variations in the total weight of the material being transported by said second unit, and means for controlling the speed of operation of the first prime mover to adjust such speed in response to changes in the speed of operation of the second prime mover and to maintain the total weight of the material transported by the second unit at a substantially constant value.

6. A feeder mechanism, comprising a first conveyor unit receiving the material to be fed from a source of supply at a varying rate, a second conveyor unit receiving the material from the first conveyor unit for delivery through a fixed, upwardly inclined path to a point of discharge at a preselected constant rate, a first prime mover for driving said first conveyor unit, a second prime mover for driving said second conveyor unit at a speed which automatically varies in inverse relationship with the total weight of the material being transported by said second unit, means for varying the speed of said first prime mover to regulate the rate at which material is delivered to said second unit, and means operatively connected to said second prime mover and responsive to variations in the speed thereof from a preselected value for actuating said speed varying means to regulate the rate of delivery of material to said second unit, the regulation of said delivery rate maintaining the total weight of the material transported by said second unit at a substantially constant value.

7. A feeder mechanism, comprising a first conveyor unit receiving the material to be fed from a source of supply at a varying rate, a second conveyor unit receiving the material from the first conveyor unit for delivery through a fixed, upwardly inclined path to a point of discharge at a preselected constant rate, a first prime mover for driving said first conveyor unit, a second prime mover for driving said second unit at a speed which automatically varies in inverse relationship with the total weight of the material being transported by said second unit, means for varying the speed of said first prime mover to regulate the rate at which material is delivered to said second unit, control means drivingly connected to said second prime mover for operation thereby at a speed directly proportional to the speed of the prime mover, and means responsive to variations in the speed of operation of said control means from a preselected value for actuating said speed varying means to regulate the rate at which material is delivered to said second unit, the regulation of said delivery rate maintaining the total weight of the material transported by said second unit at a substantially constant value.

8. A feeder mechanism, comprising a first conveyor unit receiving the material to be fed from a source of supply at a varying rate, a second conveyor unit receiving the material from the first conveyor unit for delivery through a fixed, upwardly inclined path to a point of discharge at a preselected constant rate, first and second prime movers for driving the first and second conveyor units, respectively, the speed of operation of the second prime mover automatically varying in inverse relationship with variations in the total weight of the material being transported by said second unit, a synchronous motor having a rotor operatively connected to said second prime mover for rotation thereby at a speed directly proportional to the speed of the second prime mover, said synchronous motor also having a stator supported for rotary movement, said rotor being driven by said second prime mover at the synchronous speed of said motor when a preselected constant total weight of material is being transported by said second unit, said stator being rotated in opposite directions by rotation of said rotor at speeds above and below, respectvely, said synchronous speed, and means actuated by rotation of said stator for adjusting the speed of operation of said first conveyor unit to maintain the total weight of the material transported by the second unit at a substantially constant value.

9. A feeder mechanism, comprising a first conveyor unit receiving the material to be fed from a source of supply at a varying rate, a second conveyor unit receiving the material from the first conveyor unit for delivery through a fixed, upwardly inclined path to a point of discharge at a preselected constant rate, first and second prime movers for driving the first and second conveyor units, respectively, the speed of operation of the second prime mover automatically varying in inverse relationship with variations in the total weight of the material being transported by said second unit, a synchronous motor having a rotor operatively connected to said second prime mover for rotation thereby at a speed directly proportional to the speed of the second prime mover, said synchronous motor also having a stator supported for rotary movement, said rotor being driven by said second prime mover at the synchronous speed of said motor when a preselected constant total weight of material is being transported by said second unit, said stator being rotated in opposite directions by rotation of said rotor at speeds above and below, respectively, said synchronous speed, means for varying the relationship between the total weight of the material being transported by said second unit and the speed of said second prime mover to adjust the value of the weight at which the second prime mover will rotate said rotor at the synchronous speed of the motor, and means actuated by rotation of said stator for adjusting the speed of operation of said first conveyor unit to maintain the total weight of the material being transported by said second conveyor at a substantially constant value at which said rotor will be rotated at the synchronous speed of the motor.

10. A feeder mechanism, comprising a first conveyor unit receiving the material to be fed from a source of supply at a varying rate, a second conveyor unit receiving the material from the first conveyor unit for delivery through a fixed, upwardly inclined path to a point of discharge at a preselected constant rate, first and second prime movers for driving the first and second conveyor units, respectively, the speed of operation of the second prime mover automatically varying in inverse relationship with variations in the total weight of the material being transported by said second unit, means for varying the speed of said first prime mover to adjust the delivery rate of material to said second conveyor unit, a synchronous motor having a rotor and a stator each supported for independent rotary movement, means drivingly connecting said rotor to said second prime mover for rotation thereby at the synchronous speed of the motor when the total weight of the material being transported by the second unit is at a preselected value, said stator being rotated in opposite directions by rotation of said rotor at speeds above and below said synchronous speed and remaining in a stationary position when said rotor is rotated at said synchronous speed, and means operatively connecting said stator to said speed varying means to cause the latter to increase the delivery rate of material to said second conveyor unit when the rotor is rotated at a speed above said synchronous speed and to decrease the delivery rate of material when the motor is rotated at a speed below said synchronous speed.

11. A feeder mechanism, comprising a first conveyor unit receiving the material to be fed from a source of supply at a varying rate, a second conveyor unit receiving the material from the first conveyor unit for delivery through a fixed, upwardly inclined straight path, a first electric motor for driving said first conveyor unit, a second electric motor for driving said second unit at a speed which automatically varies in inverse relationship with variations in the total weight of the material being transported by said second unit, means including a variable resistance for varying the speed of said first motor to adjust the delivery rate of material to said second conveyor unit, a synchronous motor having a rotor and a stator each supported for independent rotary movement, means drivingly connecting said rotor to said second motor for rotation thereby at the synchronous speed of the synchronous motor while the total weight of the material being transported by said second conveyor unit remains at a preselected value, said stator being rotated in opposite directions by rotation of said rotor at speeds above and below said synchronous speed and remaining in a stationary position when the rotor is rotated at said synchronous speed, and means connecting said stator to said variable resistance to increase the delivery rate of material to the second conveyor unit when the rotor is rotated at a speed above said synchronous speed and to decrease the delivery rate when the rotor is rotated at a speed below said synchronous speed.

12. A feeder mechanism, comprising a first conveyor unit receiving the material to be fed from a source of supply at a varying rate, a second conveyor unit receiving the material from the first conveyor unit for delivery through a fixed, upwardly inclined straight path, a first electric motor for driving said first conveyor unit, a second electric motor for driving said second conveyor unit at a speed which automatically varies in inverse relationship with variations in the total weight of the material being transported by said second unit, means including a variable resistance for varying the speed of said first motor to adjust the delivery rate of material to said second conveyor unit, means including a variable resistance for varying the relationship between the speed of said second motor and the total weight of the material being transported by said second conveyor unit to permit adjustment of the total weight of the material being transported at a given speed of the motor, a synchronous motor having a rotor and a stator each supported for independent rotary movement, means drivingly connecting said rotor to said second motor for rotation thereby at the synchronous speed of the synchronous motor while the second motor operates at said given speed, said stator being rotated in opposite directions by rotation of said rotor at speeds above and below, respectively, said synchronous speed and remaining in a stationary position when the rotor is rotated at said synchronous speed, and means connecting said stator to the variable resistance of the speed varying means for said first motor to increase the delivery rate of material to the second conveyor unit when the rotor is rotated at a speed above said synchronous speed and to decrease the delivery rate when the rotor is rotated at a speed below said synchronous speed.

References Cited in the file of this patent

UNITED STATES PATENTS

| | | |
|---|---|---|
| 1,721,863 | Grossler | July 23, 1929 |
| 1,777,670 | Hausman | Oct. 7, 1930 |
| 1,863,412 | Pateau | June 14, 1932 |
| 2,613,878 | Hailey | Oct. 14, 1952 |
| 2,662,665 | Harper | Dec. 15, 1953 |